United States Patent Office.

PHILEMON MERRYMAN AND ROBERT McCOMBS, OF WEST FAIRVIEW, PENNSYLVANIA.

Letters Patent No. 100,916, dated March 15, 1870.

IMPROVEMENT IN THE PUDDLING PROCESS FOR MAKING WROUGHT IRON.

The Schedule referred to in these Letters Patent and making part o the same

*To all whom it may concern:*

Be it known that we, PHILEMON MERRYMAN and ROBERT McCOMBS, of West Fairview, in the county of Cumberland, and State of Pennsylvania, have invented a new and Improved Process of Working Cast-Iron into Wrought Iron; and we do hereby declare that the following is a full, clear, and exact description of the same.

This invention has for its object to separate "cinder" from iron in puddling-furnaces, and consists in drawing off the cinder at any time before the iron comes to a "boil" or "ferment" and at any point below the foreplate.

Heretofore, the method has been not to tap off the cinder until after the iron has been made up into balls in the furnace. This method is objectionable, in that, it keeps the cinder and iron together during the whole process up to the period of balling, whereas, it is well-known that cinder has a direct tendency, as long as it is kept in contact with iron, to turn iron into cinder. Moreover, the balls produced by this process are of an inferior quality, having cinder mingled with iron in their composition. Furthermore, in the old processes, the iron, expanded by heat, rises above the foreplate and is thus exposed to direct draughts of air, which also increase the amount of cinder. Again, it is found that a good deal of iron in small lumps is mingled with the cinder when the latter is finally drawn off, all which iron is a total waste.

These mischiefs are wholly remedied by our process. The iron being the heavier, on melting, sinks to the bottom of the furnace, leaving the cinder floating on the surface, whence it may be readily drawn off. We tap the cinder just before the iron comes to a "boil" or "ferment," as then it can all be drawn. The orifice should be at any convenient point below the foreplate. The result of drawing the cinder at or before the iron comes to a boil is the removal of all impurities of whatever sort, leaving the iron pure. All the iron that by the present process is wasted, by being mixed with the cinder, is in this way saved. The drawing of the cinder so reduces the bulk of the heated mass in the furnace that it does not rise above the foreplate, and thus escapes the injurious effects produced by external air. Wrought iron made by our process is just as good after one heating as can be made in any other way from the same quality of cast-iron by heating and reheating any number of times. Our process may be carried on in any puddling-furnace, and may be tested without expense. It effects a great saving in fuel and time, and a great improvement in the quality of the iron.

Having thus described our invention,

What we claim as new, and desire to secure by Letters Patent, is—

The process of making wrought iron by drawing off the cinder from the puddling-furnace at any time before the iron comes to a boil or ferment, and at any point below the foreplate, substantially as herein described.

PHILEMON MERRYMAN.

Witnesses:
    PHILIP L. MENSHAW,
    SOLON C. KEMON.

ROBERT McCOMBS.

Witnesses:
    WILLIAM D. CARROLL,
    SOLON C. KEMON.